US012630238B2

(12) United States Patent
Calia et al.

(10) Patent No.: US 12,630,238 B2
(45) Date of Patent: May 19, 2026

(54) TRACKED UNDERCARRIAGE ROLLER ASSEMBLY

(71) Applicant: ITALTRACTOR ITM S.P.A.,
Valsamoggia—Frazione Crespellano
Bologna (IT)

(72) Inventors: Eustachio Calia,
Valsamoggia—Frazione Crespellano
Bologna (IT); Askar Echamanov,
Valsamoggia—Frazione Crespellano
Bologna (IT); Adriano Bellini,
Valsamoggia—Frazione Crespellano
Bologna (IT)

(73) Assignee: ITALTRACTOR ITM S.P.A.,
Valsamoggia—Frazione Crespellano
Bologna (IT)

( * ) Notice: Subject to any disclaimer, the term of this
patent is extended or adjusted under 35
U.S.C. 154(b) by 322 days.

(21) Appl. No.: 18/036,709

(22) PCT Filed: Nov. 10, 2021

(86) PCT No.: PCT/IB2021/060393
§ 371 (c)(1),
(2) Date: May 12, 2023

(87) PCT Pub. No.: WO2022/101793
PCT Pub. Date: May 19, 2022

(65) Prior Publication Data
US 2023/0382475 A1 Nov. 30, 2023

(30) Foreign Application Priority Data
Nov. 12, 2020 (IT) ........................ 102020000027065

(51) Int. Cl.
*B62D 55/15* (2006.01)

(52) U.S. Cl.
CPC .................................... *B62D 55/15* (2013.01)

(58) Field of Classification Search
CPC ...... B62D 55/15; B62D 55/14; B62D 55/145;
F16C 19/28; B60B 27/02
See application file for complete search history.

(56) References Cited

U.S. PATENT DOCUMENTS 2,877,059 A 3/1959 Williams
2,915,346 A * 12/1959 Stallman ................. F16C 19/49
305/136

(Continued)

FOREIGN PATENT DOCUMENTS

CN 201580462 U 9/2010
CN 102951170 A 3/2013

(Continued)

OTHER PUBLICATIONS

International Search Report and Written Opinion Issued in International Application No. PCT/IB2021/060393, Issued Feb. 23, 2022,
14 pages.

(Continued)

*Primary Examiner* — Kip T Kotter
(74) *Attorney, Agent, or Firm* — DILWORTH IP, LLC

(57) ABSTRACT

A tracked undercarriage roller assembly including a roller
body having an inner cavity delimited by a radially inner
surface and a shaft inserted into the inner cavity of the roller
body; a rolling bearing including a single radially outer
bearing ring, a first radially inner bearing ring and a second
radially inner bearing ring, a first assembly of rolling bodies
and a second assembly of rolling bodies, wherein the first
assembly of rolling bodies is radially interposed between the
radially outer bearing ring and the first radially inner bearing
ring, the second assembly of rolling bodies is radially
interposed between the radially outer bearing ring and the
second radially inner bearing ring, wherein the radially outer (Continued)

bearing ring is in contact with the radially inner surface of the roller body and wherein the first and second radially inner bearing rings are in contact with the shaft.

13 Claims, 5 Drawing Sheets

(56)                   References Cited

U.S. PATENT DOCUMENTS

| | | | | |
|---|---|---|---|---|
| 3,843,214 | A * | 10/1974 | Piepho | B62D 55/15 |
| | | | | 384/418 |
| 4,695,102 | A * | 9/1987 | Crotti | B62D 55/092 |
| | | | | 305/136 |
| 6,299,264 | B1 | 10/2001 | Kautsch et al. | |
| 6,312,161 | B1 * | 11/2001 | Williams | F16C 35/063 |
| | | | | 384/585 |
| 7,219,938 | B2 * | 5/2007 | Brister | F16C 33/768 |
| | | | | 384/459 |
| 9,534,634 | B1 * | 1/2017 | Adams | F16C 19/385 |
| 2017/0088204 | A1 | 3/2017 | Brooks et al. | |
| 2019/0195283 | A1 | 6/2019 | Ueno et al. | |
| 2020/0361547 | A1 * | 11/2020 | Chiang | B62D 55/15 |

FOREIGN PATENT DOCUMENTS

| | | | |
|---|---|---|---|
| CN | 103707901 | A | 4/2014 |
| CN | 105438296 | A | 3/2016 |
| CN | 109311517 | A | 2/2019 |
| EP | 0378738 | A1 | 7/1990 |
| JP | 2016094062 | A | 5/2016 |
| KR | 10-2017-0059778 | A | 5/2017 |

OTHER PUBLICATIONS

Office Action and Search Report received for Chinese Application No. 202180087600.4, mailed on Sep. 8, 2025, 15 pages (9 pages of original office action and 6 pages of English Translation).

* cited by examiner

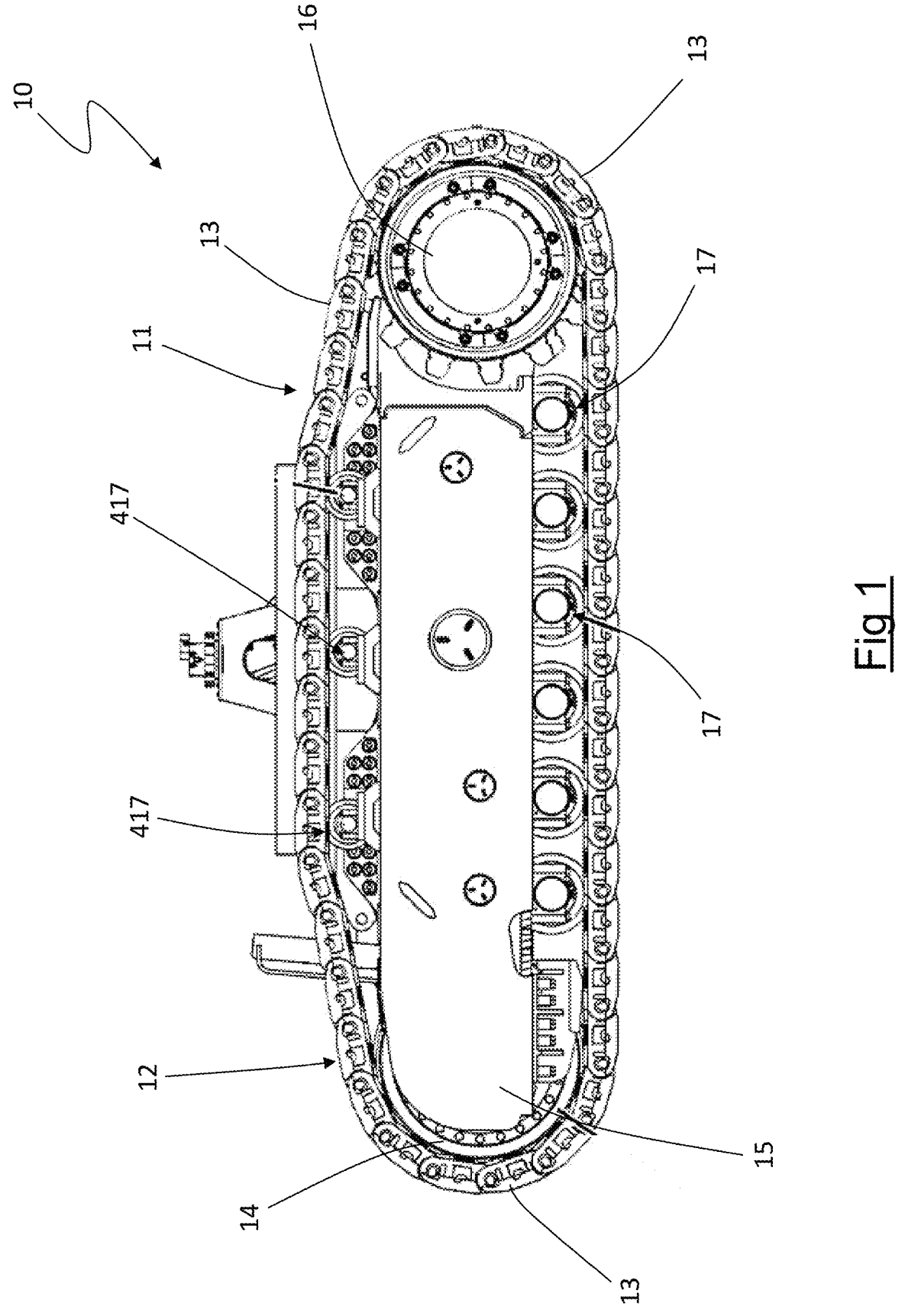
_Fig 1_

TRACKED UNDERCARRIAGE ROLLER ASSEMBLY

FIELD OF THE INVENTION

The present invention relates to a tracked undercarriage roller assembly.

BACKGROUND

Tracked undercarriages are typically used in operating machines such as earthmoving machines, mining machines, demolition machines and the like, to allow the machine to move on often uneven ground or with poor grip.

A tracked undercarriage typically comprises two chain assemblies spaced apart and arranged parallel to each other and configured to receive a drive torque and transfer it to the ground. Each chain assembly comprises a plurality of under-carriage components which usually comprise a closed loop chain on a driving wheel and an idler wheel (or idler) operatively connected to a tensioner assembly. The under-carriage components further comprise, between the driving wheel and the idler wheel, a plurality of roller assemblies configured to guide the chain during its motion. The roller assemblies usually include one or more upper roller assemblies and a plurality of lower roller assemblies.

The chain usually comprises a plurality of joints, the term joint referring to the single component of the chain which is articulated to the other components. Typically, each joint comprises a pair of links facing each other. The joints are interconnected by pins. Each pin is usually inserted in holes included on the links and connects two joints together. The soles are usually mounted on the joints which, being in direct contact with the ground, have the task of discharging the traction to the ground and increasing the contact surface between machine and ground. The type of sole used depends on the ground on which the machine must operate, on the conditions of the environment in which the machine must operate and on the specifications suggested by the machine manufacturer.

Each roller assembly usually comprises a roller body crossed by a shaft. The roller assembly is delimited by a radially inner surface facing the shaft, in particular facing the outer surface of the shaft. The roller body can rotate about the shaft which is fixed with respect to the frame of the undercarriage on which it is mounted.

The roller assemblies are subjected to loads directed parallel to the shaft and directed perpendicular to the shaft during the operation of the operating machine, which are generated by the weight of the operating machine itself and the forces exchanged between the operating machine and the external environment. In order to ensure that the roller bodies rotate correctly with respect to the respective shafts, transferring such loads between the roller body and the shaft, the roller assemblies are fitted with rolling bearings having tapered rollers with an inclined axis with respect to the shaft.

The tapered rolling bearings comprise a radially inner bearing ring, otherwise known as the cone, a radially outer bearing ring, otherwise known as the cup, and tapered rolling members, otherwise known as rollers, with an inclined rotation axis which are interposed between the cone and the cup and which are retained by a cage which makes them free to rotate about the respective rotation axes. Typically two axially spaced tapered rolling bearings are provided, in which the respective rotating members have respective rotation axes converging towards a central point of the roller assembly.

Each tapered rolling bearing is mounted with the cone in contact with the shaft and the cup in contact with the radial inner surface of the roller body. The cup of each rolling bearing is inserted into the roller body by interference fit with the radial inner surface of the roller body until it goes into axial abutment with a respective shoulder obtained on the radially inner surface of the roller body. A single cone with the relative rollers is fitted on the shaft, sliding thereon until it goes to abut against a shoulder obtained on the shaft. The shaft is then inserted into the roller body so that the cone with the relative rollers is accommodated by the respective cup. The cone and the relative rollers of the other rolling bearing are then slidingly fitted onto the shaft until they reach the respective cup and are accommodated by the cup.

The cones and the relative rollers need to be retained axially, possibly with a small axial clearance (typically a few tenths of a millimetre) to prevent them from moving axially with respect to the relative cups.

To this end, one or two threaded portions are provided on the shafts, each configured to receive an adjustment ring nut active in the axial direction (directly or through spacers) on a respective cone. By screwing or unscrewing the adjust-ment ring nut with respect to the threaded portion of the shaft, the axial clearance of the cones can be adjusted to bring it within the predetermined values. Once the adjust-ment ring nut has been adjusted, it is locked in position by a cotter pin, or similar device, to prevent movements thereof during the use of the roller assembly.

The assembly thus created is closed by two axial end supports placed at the axial ends of the roller body and made integral with the shaft and the undercarriage frame.

The Applicant has noted that the assembly and mainte-nance of the roller bodies briefly described above can be complex and difficult to implement.

In fact, the Applicant has noted that during the assembly of the roller assemblies, particular attention must be paid to the correct axial tightening of the tapered rolling bearings by acting on the adjustment ring nuts with precision and care. In fact, the Applicant has verified that a few tenths of a millimetre error in tightening the adjustment ring nut can lead to preload variations (in kilograms) of up to two orders of magnitude on the rolling bearing, resulting in almost immediate failure of the rolling bearing in the event of excessive tightening, or significant decreases, up to 80%, in the operating life of the rolling bearing in the event of insufficient tightening.

The Applicant has also verified that the correct tightening of the adjustment ring nuts, besides being complex, requires the use of specialised labour which, although available during the manufacturing and initial installation of the roller assemblies, may not be available during the maintenance of the roller assemblies especially when the operating machine is in use in remote and inaccessible regions.

The Applicant has perceived that it would be advanta-geous to set the axial clearance of the rolling bearings without requiring a continuous or step-by-step adjustment of the adjustment ring nut. In fact, the Applicant has perceived that arranging an unambiguous and predetermined setting of the axial clearance of the rolling bearings would allow easier and more immediate installation and maintenance of the rolling bearings.

The Applicant has therefore hypothesised providing the shaft or the roller body with a predetermined reference for each rolling bearing which acts as an end stop for the insertion of the adjustment ring nut, so as to bring the adjustment rings to respective predetermined distances from the rolling bearing cones and to obtain a predetermined and unique setting of the axial clearance of the rolling bearings.

However, the Applicant has verified that the exact axial distance of the two rolling bearing cones has an uncertainty given by the chain of tolerances necessary for the production and assembly of the roller assembly.

In fact, the Applicant has verified that the manufacturing tolerances of the rolling bearings typically used in roller assemblies are of the order of about 0.2 millimetres, i.e., the exact axial dimension of the rolling bearing cone (and cup) can be determined a priori with an error of about 0.2 millimetres. The press fitting, i.e., the insertion of a cup into the roller body by interference fit, abutted against the shoulder obtained in the roller body has a tolerance of about 0.05 millimetres due to the manufacturing process of the shoulder and the press fitting of the cup. The chain of tolerances described above must be considered in relation to each rolling bearing, leading to an indetermination in the axial distance of the cones of at least 0.5 millimetres. The Applicant has therefore estimated that the exact axial distance separating the two cones of the two rolling bearings is subject to an uncertainty of about 0.5 millimetres, with the consequence that any fixed references or predetermined end stops for the adjustment rings would not allow the cones to be tightened correctly and thus the rolling bearings and the roller assembly to function correctly.

SUMMARY

The present invention relates to a tracked undercarriage roller assembly comprising:
- a roller body having an inner cavity delimited by a radially inner surface and a shaft inserted into the inner cavity of the roller body;
- a rolling bearing comprising a single radially outer bearing ring, a first radially inner bearing ring and a second radially inner bearing ring, a first assembly of rolling bodies and a second assembly of rolling bodies, in which the first assembly of rolling bodies is radially interposed between the radially outer bearing ring and the first radially inner bearing ring, the second assembly of rolling bodies is radially interposed between the radially outer bearing ring and the second radially inner bearing ring, in which the radially outer bearing ring is in contact with the radially inner surface of the roller body and in which the first radially inner bearing ring and the second radially inner bearing ring are in contact with the shaft.

The Applicant has perceived that by providing the roller assembly with a single rolling bearing having a single radially outer bearing ring (i.e., a single cup), two radially inner bearing rings (i.e., two cones) and two sets of rolling bodies radially interposed between the single cup and the two cones, the uncertainty in the actual axial distance of the cones is sufficiently small and such as to allow the use of end stops or fixed references to lock the axial clearance of the cones.

In fact, the Applicant has perceived that in such a rolling bearing the axial length of the single cup, and therefore the nominal distance between the two cones, is affected by the manufacturing tolerances of the rolling bearing which can be contained in a few hundredths of a millimetre, for example in about 0.15 millimetres. Added to such an indeterminacy is the indeterminacy in the position of the cone in relation to the roller body, which is a few hundredths of a millimetre, for example 0.05 millimetres.

The two radially inner bearing rings and the two assemblies of rolling bodies ensure a correct operation of the roller assembly by axially distancing the two assemblies of rolling bodies (and consequently the two radially inner bearing rings) by a predetermined design distance, simply by providing the radially upper bearing ring with a corresponding axial dimension.

The single radially outer bearing ring can be in one piece, i.e., made from a single body, or it can be made from two or more bodies joined together to form the single radially outer bearing ring.

The terms "axial", "axially", "radial" and "radially", are used with reference to a rotation axis of the roller assembly.

In particular, the terms "axial" and "axially" mean references/quantities arranged/measured or extending in a direction parallel or coincident with the rotation axis of the roller assembly.

The terms "radial" and "radially" mean references/quantities arranged/measured or extending in a direction perpendicular to the rotation axis of the roller assembly.

The terms "radially inner" and "radially outer" mean respectively a position closer to or further away from said rotation axis.

The terms "axially inner/outer" mean respectively a position closer to and further away from a point of the roller assembly placed along the rotation axis and equally spaced apart from shaft axial ends.

The term "press fitting" refers to a joining of two parts or components, obtained by interference fit, in which the two parts or components are constrained to each other with respect to rotations and translations.

In some designs, the radially outer bearing ring is inserted by interference fit on the radially inner surface of the roller body. Such a coupling allows the bearing ring to be constrained radially outside the roller body.

In some designs, both radially inner bearing rings are inserted by interference fit on the shaft.

The Applicant has found that by press fitting the radially outer ring in the roller body and the radially inner bearing rings on the shaft, any adjustment ring nut can be eliminated and the use of end stops or fixed references to lock the axial clearance of the radially inner bearing rings can be avoided.

In fact, the Applicant has perceived that the single rolling bearing could first be press fitted on the shaft (by press fitting the radially inner bearing rings on the shaft) and then the assembly given by the shaft and the rolling bearing could be inserted in the roller body by press fitting the rolling bearing (in particular the radially outer bearing ring) in the roller body.

In some embodiments, the radially outer bearing ring is not anchored in the roller body but is slidingly inserted into the inner cavity of the roller body with an outer surface of the radially outer bearing ring in contact with the radially inner surface of the roller body.

In some embodiments of the invention, said roller body comprises a first annular recess along the radially inner surface; a stop ring being inserted into said first annular recess and being active on the radially outer bearing ring.

The radially outer bearing ring is preferably pressed against the stop ring, which provides an end stop or regardless a reference for the positioning of the radially outer bearing ring in relation to the roller body, irrespective of whether the radially inner bearing ring is press fitted in the roller body or slidingly inserted therein.

In some embodiments of the invention, said roller body comprises a second annular recess along the radially inner surface; a stop ring being inserted in said second annular recess and being active on the radially outer bearing ring from the opposite part with respect to the stop ring inserted in the first recess.

The radially outer bearing ring is preferably pressed against the stop ring, which provides an end stop or regardless a reference for the positioning of the radially outer bearing ring with respect to the roller body. The second annular recess and the corresponding stop ring are preferably provided when the radially outer bearing ring is not anchored in the roller body.

In some embodiments of the invention, said roller body comprises a shoulder provided on the radially inner surface; said radially outer bearing ring being in abutment against said shoulder. The shoulder is preferably provided when the radially outer bearing ring is press fitted in the roller body and acts as an end stop when the radially outer bearing ring is inserted into the roller body.

In some embodiments of the invention, a shoulder can be provided on the radially inner surface of the roller body and, in an axially opposite position, an annular recess and a stop ring inserted in the recess.

In some embodiments of the invention, said shaft comprises a first annular recess along its radially outer surface; a stop ring being inserted into said first annular recess and being active on the second radially inner bearing ring.

The second radially inner bearing ring is preferably abutted against the stop ring, which provides a reference for the positioning of the second radially inner bearing ring with respect to the shaft, regardless of whether the second radially inner bearing ring is press fitted on the shaft or fitted thereon.

In some embodiments, said shaft comprises a second annular recess along its radially outer surface; a stop ring being inserted into said second annular recess and being active on the first radially inner bearing ring.

The first radially inner bearing ring is preferably in abutment against the stop ring, which provides a reference for positioning the first radially inner bearing ring with respect to the shaft, regardless of whether the second radially inner bearing ring is press fitted on the shaft or fitted thereon.

In some embodiments of the invention, the radially inner bearing rings are slidingly inserted on the shaft. In these embodiments, the radially inner bearing rings are not press fitted on the shaft but are fitted without interference fit on a radially outer surface of the shaft. In these embodiments it can be envisaged to first constrain the rolling bearing to the roller body, insert the shaft into the inner cavity of the roller body and lock the rolling bearing axially with respect to the shaft.

Preferably, when the first and second recesses are provided on the radially outer surface of the shaft, the rolling bearing is fitted on the shaft and not press fitted thereon.

Preferably, said roller body comprises a first axial end and a second axial end opposite the first axial end.

Preferably, said rolling bearing is active between a first zone of the inner cavity of the roller body which is axially closer to the first axial end of the roller body with respect to the second axial end and a second zone of the inner cavity of the roller body axially closer to the second axial end of the roller body with respect to the first axial end.

In other words, the rolling bearing preferably extends in a central zone of the roller assembly, i.e., in a zone located substantially centrally with respect to the first and the second axial ends of the roller body.

Preferably, said radially inner surface of the roller body is cylindrical between said first zone and said second zone of the inner cavity. Thereby, the radially outer bearing ring of the rolling bearing can be made cylindrical and can easily couple with the radially inner surface of the roller body.

Preferably, said inner cavity has a radial extension, between said second zone and the second axial end of the roller body, equal to or greater than the extension of the inner cavity between said first zone and said second zone.

Thereby, the radially outer bearing ring or the entire rolling bearing can be inserted into the roller body through the second axial end of the roller body.

Preferably, said shaft comprises a central portion extending between the first and the second zones of the inner cavity of the roller body. The first and the second radially inner bearing rings are placed in the central portion of the shaft.

Preferably, said central portion of the shaft has a radially outer cylindrical surface with a constant diameter. Thereby, the radially inner bearing rings can be made cylindrical and can easily couple with the radially outer surface of the central portion of the shaft.

Preferably, said shaft comprises a first axial end and a second axial end.

Preferably, said radially outer surface of the shaft is cylindrical between the central portion and the second end with a diameter equal to or less than the diameter of the central portion.

Thereby, the radially inner bearing rings or the entire rolling bearing can be inserted onto the shaft through the second end of the shaft and reach the central portion.

Preferably, said roller body comprises a central body, a first axial end flange and a second axial end flange placed at respective axial ends of the central body; said central body defining said inner cavity of the roller body.

The first and the second flanges are preferably connected to the central body and close the inner cavity of the roller body.

Preferably, hydraulic seals configured to allow a relative rotation between the roller body and the shaft and to fluid-tightly seal the inner cavity are provided between each flange and the shaft.

Preferably, the inner cavity is filled with oil or lubricating grease to cool or otherwise lubricate the rolling bearing.

The central body can be made in one piece or can be made from two half-pieces joined together.

In some embodiments of the invention, the first flange is a single piece with the central body. In these embodiments, the second flange is permanently connected to the assembly given by the central body and the first flange.

BRIEF DESCRIPTION OF THE DRAWINGS

Further features and advantages of the invention will be more evident from the following description of a preferred embodiment thereof, made with reference to the appended drawings. In such drawings:

FIG. 1 is a schematic side view of a tracked undercarriage;

DETAILED DESCRIPTION

Figure 2:
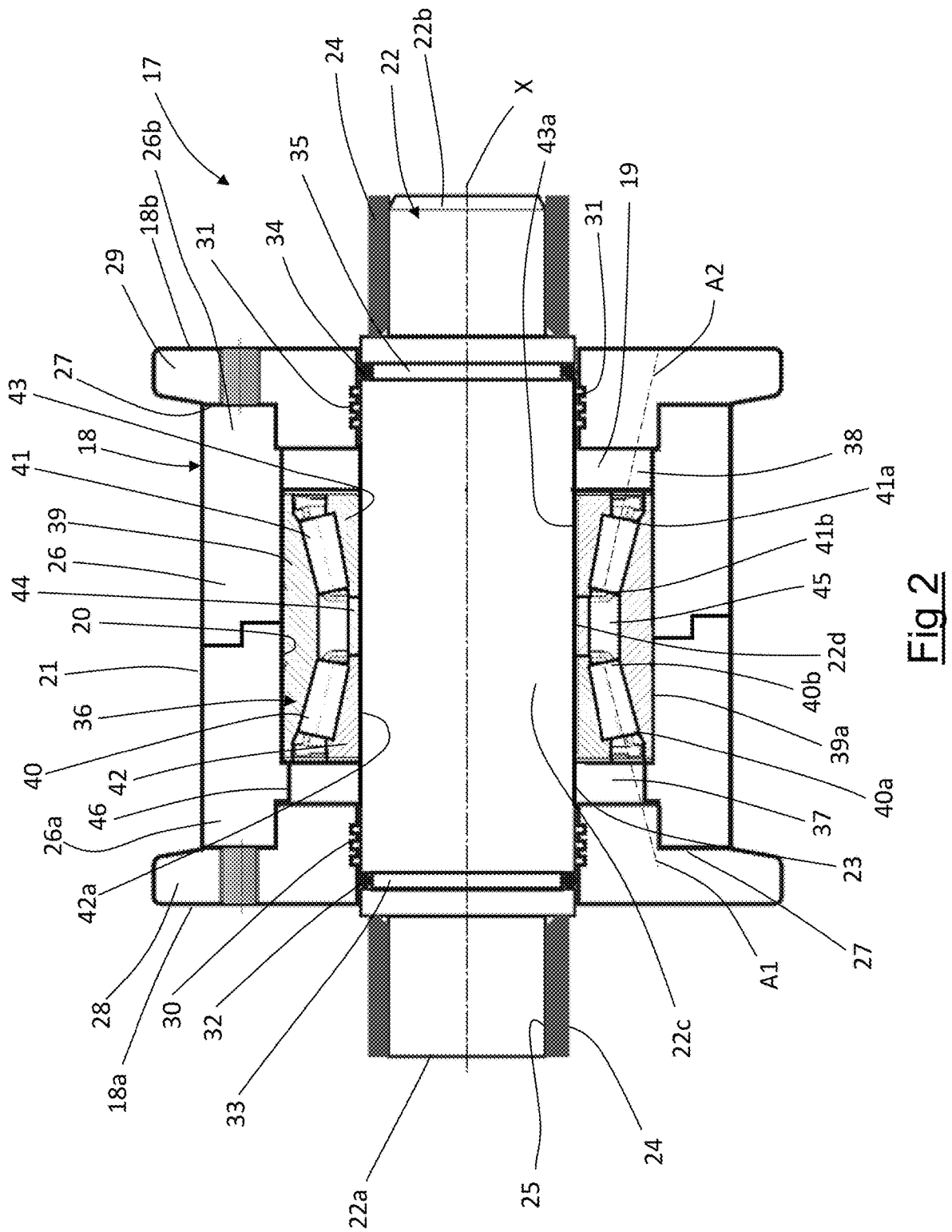
FIG. 2 is a schematic sectional view of a roller assembly of the tracked undercarriage of FIG. 1 in accordance with the present invention and according to a first embodiment.

FIG. 1 is a schematic side view showing some components of a tracked undercarriage. The tracked undercarriage 10 comprises two track assemblies 11, of which only one is visible in FIG. 1. Each track assembly 11 comprises a chain 12, comprising a plurality of links 13 interconnected to one another by pins and bushings (not shown), a return wheel 14, in the figure partially hidden by a crankcase 15, and a driving wheel 16. A plurality of roller assemblies 17, 117, 217, 317, 417 is arranged between the return wheel 14 and the driving wheel 16, in particular one or more upper roller assemblies 417 and a plurality of lower roller assemblies arranged 17, 117, 217, 317 in contact with the links 13 and adapted to guide the chain 12 in its motion.

The lower roller assemblies 17, 117, 217, 317 are arranged in the lower portion of the track assembly 11 and are configured to transfer loads between the track and an undercarriage frame (not shown).

The upper roller assemblies 417 are configured to guide the chain between the driving wheel 16 and the return wheel 14 and typically are present in a lower number than the number of the lower roller assemblies. The number of the lower roller assemblies 17, 117, 217, 317 varies depending on the type of machine and the weight thereof.

With reference to FIGS. 2 to 5, some preferred embodiments of a preferably lower roller assembly 17, 117, 217, 317 in accordance with the present invention are shown. Identical reference numbers refer to identical features of each embodiment, the differences therebetween will be evident in the following.

FIGS. 2 to 5 are seen in section of a lower roller assembly 17, 117, 217, 317. The section plane is a longitudinal plane transversal to the links 13 of the chain 12, and hence to the direction of movement of the tracked undercarriage, passing through the rotation axis X of the roller assembly 17, 117, 217, 317.

The roller assembly 17, 117, 217, 317 comprises a roller body 18, 118, 218, 318 comprising an inner cavity 19, 219, 319 which extends from a first axial end 18*a* to a second axial end 18*b* of the roller body 18, 118, 218, 318.

The roller body 18, 118, 218, 318 is delimited by a radially inner surface 20, 220, 320 which delimits the inner cavity 19, 219, 319 in a radially outer direction and by a radially outer surface 21 whose shape is determined by the type of chain 12 with which the roller assembly 17, 117, 217, 317 must interact.

The roller body 18, 118, 218, 318 is preferably made of a low-alloy steel that is boron-alloyed and submitted to at least one heat treatment. A low-alloy steel is a steel in which other elements other than iron and carbon are present and in which none of such other elements is present in an amount higher than 5%.

The roller assembly 17, 117, 217, 317 further comprises a shaft 22, 122, 222, 322 inserted into the inner cavity 19, 219, 319 of the roller body 18, 118, 218, 318. The shaft 22, 122, 222, 322 extends between a first axial end 22*a* and a second axial end 22*b* and has a radially outer surface 23, 123, 223, 323 facing the radially inner surface 20, 220, 320 of the roller body 18, 118, 218, 318.

The shaft 22, 122, 222, 322 is preferably made of boron-alloyed low-alloy steel which has undergone at least one heat treatment or of micro-alloyed steel which does not require any heat treatment The shaft 22, 122, 222, 322 has a greater extension in an axial direction than the extension in an axial direction of the roller body 18, 118, 218, 318. In other words, the distance in the axial direction between the first axial end 22*a* and the second axial end 22*b* of the shaft 22, 122, 222, 322 is greater than the distance measured along the same direction between the first axial end 18*a* and the second axial end 18*b* of the roller body 18, 118, 218, 318.

The shaft 22, 122, 222, 322 extends axially beyond the first 18*a* and the second axial end 18*b* of the roller body 18, 118, 218, 318. In particular, the shaft extension in axial direction beyond the first axial end 18*a* of the roller body 18, 118, 218, 318 is substantially equal to the extension in axial direction of the shaft 22, 122, 222, 322 beyond the second axial end 18*b* of the roller body 18, 118, 218, 318.

The shaft portion 22, 122, 222, 322 which extends in an axially outer direction from the first axial end 18*a* of the roller body 18, 118, 218, 318 is made integral with the undercarriage frame or with an undercarriage component integral with the undercarriage frame.

For this purpose a support 24 is provided (schematically indicated in FIGS. 2 to 5) which is made integral with the undercarriage frame or with an undercarriage component integral with the undercarriage frame provided with an inner through cavity 25 in which the shaft portion 22, 122, 222, 322 is inserted extending in an axial outer direction from the first axial end 18*a* of the roller body 18, 118, 218, 318.

To make the shaft 22, 122, 222, 322 integral with the support 24, the shaft 22, 122, 222, 322 can comprise a radial cavity (not shown) which crosses the shaft 22, 122, 222, 322 in a radial direction. On the support 24 two radially opposite through holes are formed which can be aligned therebetween and aligned with the radial cavity of the shaft 22, 122, 222, 322. A plug (not shown) can be inserted into the radial cavity so that it passes through the radial cavity and intercepts the two through holes of the support 24. Thereby, any axial movement and any rotation about the rotation axis X of the shaft 22, 122, 222, 322 with respect to the support 24 is prevented.

Similarly, the shaft portion 22, 122, 222, 322 which extends in an axial outer direction from the second axial end 18*b* of the roller body 18, 118, 218, 318 is made integral with the undercarriage frame or with an undercarriage component integral with the undercarriage frame through an analogous support 24.

The roller body 18, 118, 218, 318 is mounted rotatable with respect to the shaft 22, 122, 222, 322 about the rotation axis X.

The roller body 18, 118, 218, 318 comprises a central body 26, 126, 226, 326 directly facing the inner cavity 19, 219, 319 on which the radially inner surface 20, 220, 320 of the roller body 18, 118, 218, 318 is obtained. The central body 26, 126, 226, 326 has axial ends 27.

The central body 26, 126, 226, 326 can be made in a single piece or, more preferably, obtained by welding or by joining two half-parts by interference (not shown).

FIG. 2 schematically shows the central body 26 made of two half-parts 26*a*, 26*b* joined together to form a single body.

At one axial end 27 of the central body 26, 126, 226, 326, the roller body 18, 118, 218, 318 comprises a first axial end flange 28, 328 and at the other axial end 27 of the central body 26, 126, 226, 326, the roller body 18, 118, 218, 318 comprises a second axial end flange 29, 329.

Both the first 28, 328 and the second axial end flanges 29, 329 are integral with the central body 26, 126, 226, 326, i.e., they rotate about the axis X together with the central body 26, 126, 226, 326.

The first 28, 328 and second axial end flanges 29, 329 extend radially up to the shaft 22, 122, 222, 322. In particular, the first flange 28, 328 comprises a radially inner surface 30, 330 directly facing the shaft 22, 122, 222, 322. Similarly, the second flange 29, 329 comprises a radially inner surface 31, 331 directly facing the shaft 22, 122, 222, 322.

Figure 3:
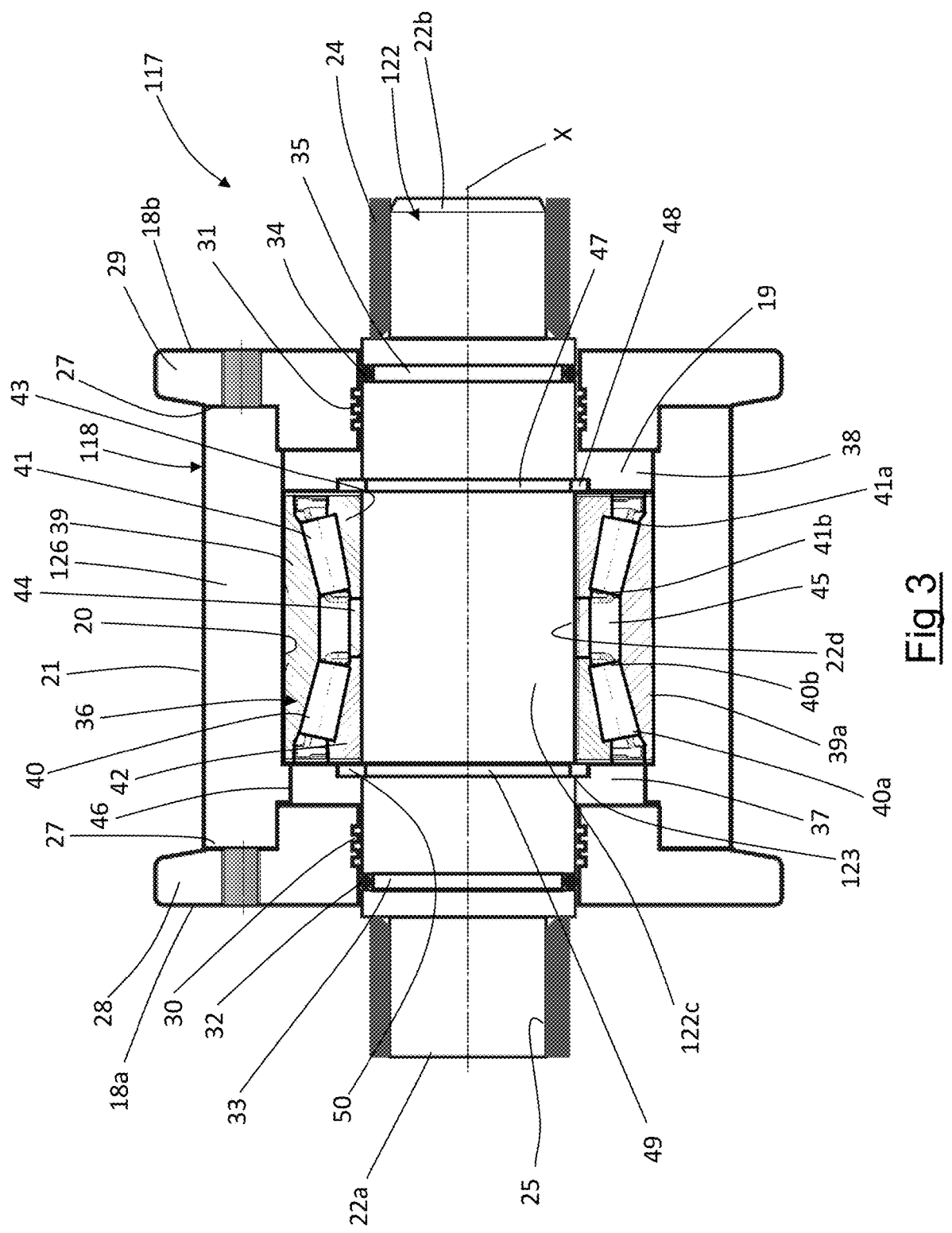
FIG. 3 is a schematic sectional view of the roller assembly of the tracked undercarriage of FIG. 1 according to a second embodiment.
Figure 4:
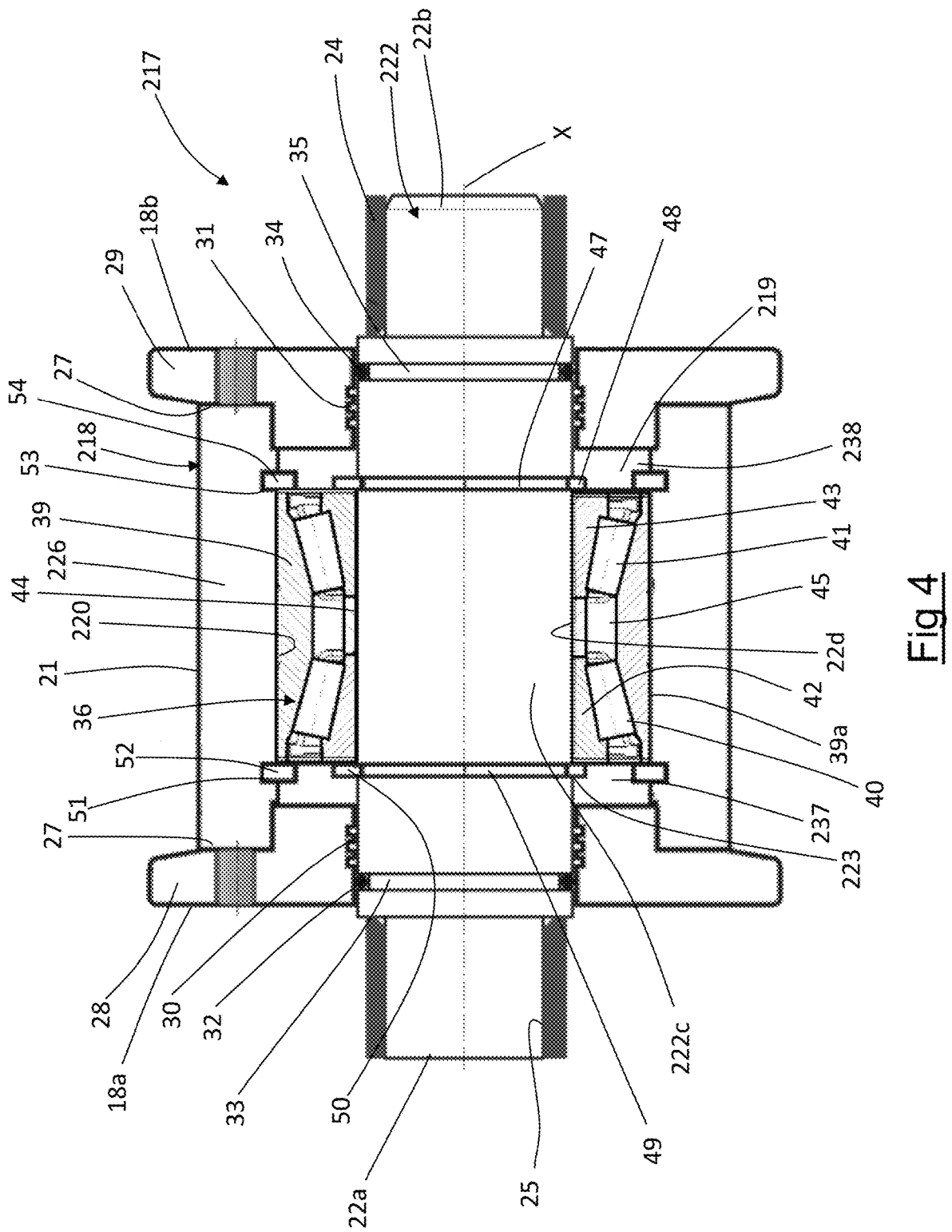
FIG. 4 is a schematic sectional view of the roller assembly of the tracked undercarriage of FIG. 1 according to a third embodiment.

The inner cavity 19, 219, 319 is closed in the axial direction at the first flange 28, 328 by hydraulic seal members 32, 332 interposed between the radially inner surface 30, 330 of the first flange 28, 328 and the shaft 22, 122, 222, 322. Such hydraulic seal members 32 can be O-rings inserted in an annular sealing groove 33 obtained on the shaft 22, 122, 222, as shown in the embodiments of FIGS. 2 to 4.

Figure 5:
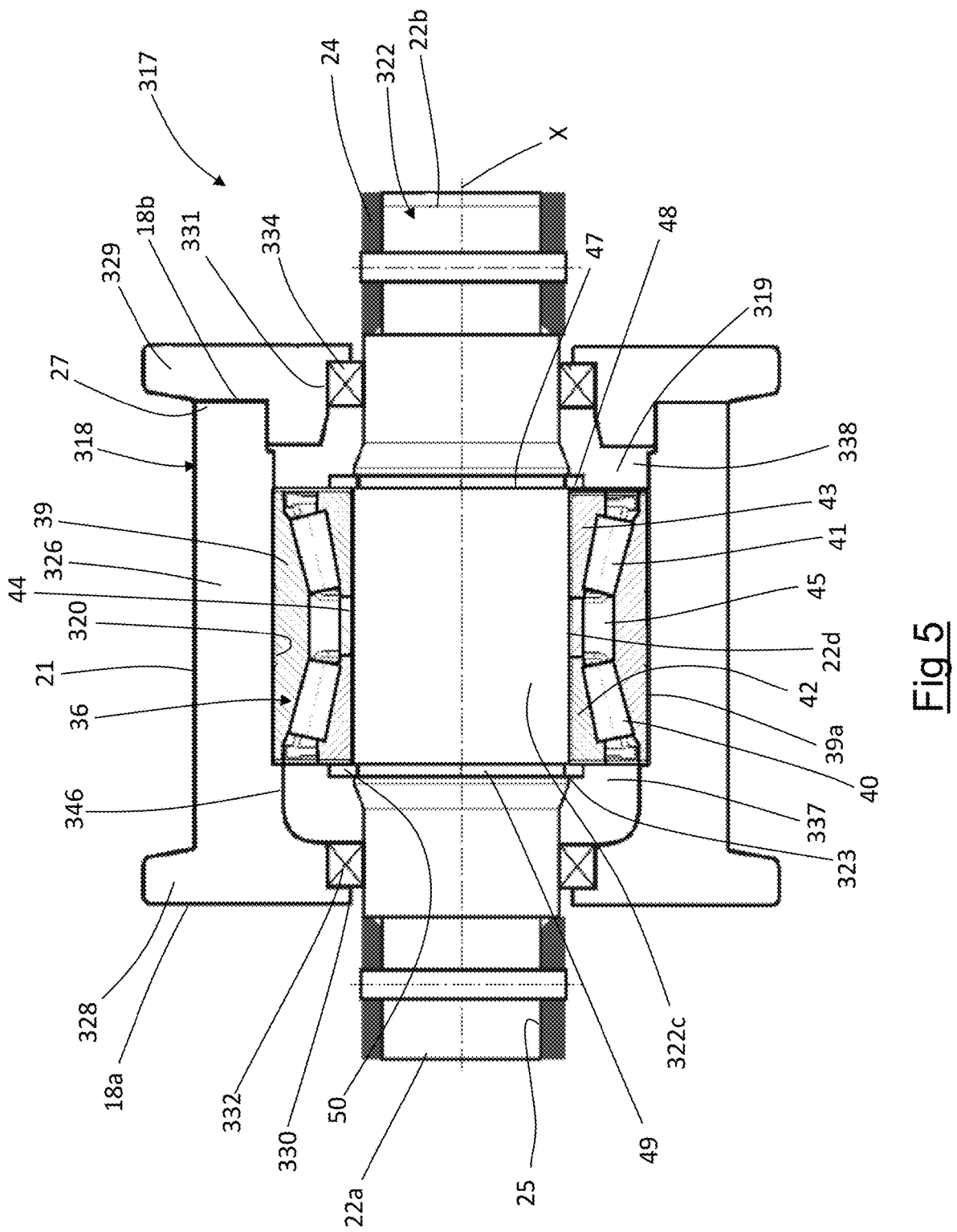
FIG. 5 is a schematic sectional view of the roller assembly of the tracked undercarriage of FIG. 1 according to a fourth embodiment.

Alternatively, such hydraulic seal members 332 can be rotating hydraulic cassette seals fitted on the shaft 322 and active on the radially inner surface 30, 330, as schematically shown in the example of FIG. 5. Alternatively, such hydraulic seal members 32,332 can be lip gaskets (not shown) active between the shaft 22, 122, 222, 322 and the radially inner surface 30, 330 of the first flange 28, 328.

The inner cavity 19, 219, 319 is closed in the axial direction at the second flange 29, 329 by hydraulic seal members 34, 334 interposed between the radially inner surface 31, 331 of the second flange 29, 329 and the shaft 22, 122, 222, 322. Such hydraulic seal members 34 can be O-rings inserted in an annular sealing groove 35 obtained on the shaft 22, 122, 222, as shown in the embodiments of FIGS. 2 to 4. Alternatively, such hydraulic seal members 334 can be rotating hydraulic cassette seals fitted on the shaft 322 and active on the radially inner surface 31, as schematically shown in the example of FIG. 5. Alternatively, such hydraulic seal members 34, 334 can be lip gaskets (not shown) active between the shaft 22, 122, 222, 322 and the radially inner surface 31, 331 of the second flange 29, 329.

In all the embodiments of the invention, the roller assembly 17, 117, 217, 317 comprises a rolling bearing 36 inserted into the inner cavity 19, 219, 319 and active between the shaft 22, 122, 222, 322 and the radially inner surface 20, 220, 320 of the roller body 18, 118, 218, 318.

Preferably only one rolling bearing 36 is provided.

The rolling bearing 36 extends between a first zone 37, 237, 337 of the inner cavity 19, 219, 319 located axially near the first axial end 18a of the roller body 18, 118, 218, 318 and a second zone 38, 238, 338 of the inner cavity 19, 219, 319 located axially near the second axial end 18b of the roller body 18, 118, 218, 318. The first zone 37, 237, 337 is also closer to the first axial end 18a than it is to the second axial end 18b and the second zone 38, 238, 338 is closer to the second axial end 18b than it is to the first axial end 18a. The first zone 37, 237, 337 of the inner cavity 19, 219, 319 is radially placed at the portion of the inner cavity 19, 219, 319 subtended between the central body 26, 126, 226, 326 of the roller body 18, 118, 218, 318 and the shaft 22, 122, 222, 322 and not affected by the rolling bearing 36. The first zone 37, 237, 337 is axially placed between the first flange 28, 328 and the rolling bearing 36. The second zone 38, 238, 338 of the inner cavity 19, 219, 319 is radially placed at the portion of the inner cavity 19, 219, 319 subtended between the central body 26, 126, 226, 326 of the roller body 18, 118, 218, 318 and the shaft 22, 122, 222, 322 and not affected by the rolling bearing 36. The second zone 38, 238, 338 is axially placed between the second flange 29, 329 and the rolling bearing 36.

As illustrated in FIGS. 2 to 4, the rolling bearing 36 is placed at a central portion 22c, 122c, 222c of the shaft 22, 122, 222 placed between the first 22a and the second axial end 22b.

The rolling bearing 36 is unique, i.e., there is preferably only one rolling bearing 36 in the active roller assembly 17, 117, 217, 317 between the shaft 22, 122, 222, 322 and the radially inner surface 20, 220, 320 of the roller body 18, 118, 218, 318.

The rolling bearing 36 comprises a single radially outer bearing ring 39 (or cup), a first assembly of rolling bodies 40 and a second assembly of rolling bodies 41, a first radially inner bearing ring 42 (or first cone) and a second radially inner bearing ring 43 (or second cone).

The first assembly of rolling bodies 40 is radially interposed between, and directly active on, the radially outer bearing ring 39 and the first radially inner bearing ring 42.

The second assembly of rolling bodies 41 is radially interposed between, and directly active on, the radially outer bearing ring 39 and the second radially inner bearing ring 43.

The first assembly of rolling bodies 40 comprises a plurality of spheres, or more preferably barrel-shaped or truncated cone-shaped rollers arranged circumferentially. The rolling bodies 40 comprise a first axial end 40a with a larger diameter than a second axial end 40b. Similarly, the second assembly of rolling bodies 41 comprises a plurality of spheres, or more preferably barrel-shaped or truncated cone-shaped rollers arranged circumferentially. The rolling bodies 41 comprise a first axial end 41a with a larger diameter than a second axial end 41b.

The second axial ends 40b of the rolling bodies of the first assembly of rolling bodies 40 are axially facing the second axial ends 41b of the rolling bodies of the second assembly of rolling bodies 41.

The rolling axes A1 of the first assembly of rolling bodies 40 are inclined with respect to the rotation axis X, just as the rolling axes A2 of the second assembly of rolling bodies 41 are inclined with respect to the rotation axis X.

In preferred embodiments of the invention, the rolling axes A1, A2 of the two assemblies of rolling bodies 40, 41 are inclined so that the first axial ends 40a of the rolling bodies of the first assembly of rolling bodies 40 are positioned radially further away from the rotation axis X with respect to the second axial ends 40b of the rolling bodies of the first assembly of rolling bodies 40, and that the first axial ends 41a of the rolling bodies of the second assembly of rolling bodies 41 are positioned radially further away from the rotation axis X with respect to the second axial ends 41b of the rolling bodies of the second assembly of rolling bodies 41.

In alternative embodiments not shown, the rolling axes A1, A2 of the two assemblies of rolling bodies 40, 41 are inclined so that the first axial ends 40a of the rolling bodies of the first assembly of rolling bodies 40 are radially closer to the rotation axis X with respect to the second axial ends 40b of the rolling bodies of the first assembly of rolling bodies 40 and that the first axial ends 41a of the rolling bodies of the second assembly of rolling bodies 41 are radially closer to the rotation axis X with respect to the second axial ends 41b of the rolling bodies of the second assembly of rolling bodies 41.

The extension in the axial direction of the radially outer bearing ring 39 is at least equal to the sum of the radial extensions of the first radially inner bearing ring 42 and the second radially inner bearing ring 43, preferably it is greater than the sum of the radial extensions of the first radially inner bearing ring 42 and the second radially inner bearing ring 43.

Between the first radially inner bearing ring 42 and the second radially inner bearing ring 43, a closing ring 44 is axially arranged to close a lubrication cavity 45, preferably filled with oil or lubricating grease, of the rolling bearing 36.

In all the embodiments, the radially inner surface 20, 220, 320 of the roller body is cylindrical at the radially outer bearing ring 39 of the rolling bearing 36. The radially outer bearing ring 39 is also cylindrical at a radially outer surface 39a thereof to be counter-shaped to the portion of the radially outer surface 20, 220, 320 of the roller body 18, 118, 218, 318 receiving the radially outer bearing ring 39.

The rolling bearing 36 can be pre-assembled, as in the preferred embodiment of the invention. The pre-assembled rolling bearing envisages that the first 42 and the second radially inner bearing ring 43 are operatively associated with the radially outer bearing ring 39 with the first assembly of rolling bodies 40 and the second assembly of rolling bodies 41 radially inserted between the first 42 and the radially outer bearing ring 39 and the second radially inner bearing ring 43 and the radially outer bearing ring 39, respectively. In the pre-assembled rolling bearing, the closing ring 44 is also in the operating position.

The diameter of the inner cavity 19, 219, 319 is constant at the radially inner surface portion 20, 220, 320 of the roller body 18, 118, 218, 318 which receives the radially outer bearing ring 39 of the rolling bearing 36. Between the second zone 38, 238, 338 of the inner cavity 19, 219, 319 and the second axial end 18b of the roller body, the inner cavity 19, 219, 319 has a substantially cylindrical shape with a diameter equal to or greater than the diameter at the radially outer bearing ring 39 of the rolling bearing 36. Between the second zone 38, 238, 338 of the inner cavity 19, 219, 319 and the second axial end 18b of the roller body, the inner cavity 19, 219, 319 therefore has a diameter equal to or greater than the maximum dimension in the radial direction of the rolling bearing 36.

The central portion 22c, 122c, 222c, 322c of the shaft 22, 122, 222, 322 has a radially outer surface 22d which is cylindrical with a constant diameter. The first radially inner bearing ring 42 and the second radially inner bearing ring 43 have respective radially inner surfaces 42a, 43a of an annular shape with a minimum diameter substantially corresponding to the diameter of the central portion 22c, 122c, 222c, 322c of the shaft 22, 122, 222, 322.

Between the second axial end 22b and the central portion 22c, 122c, 222c, 322c the shaft 22, 122, 222, 322 has an extension in the radial direction of a size equal to or less than the diameter of the central portion 22c, 122c, 222c, 322c. Similarly, between the first axial end 22a and the central portion 22c, 122c, 222c, 322c, the shaft 22, 122, 222, 322 has an extension in the radial direction of a size equal to or less than the diameter of the central portion 22c, 122c, 222c, 322c.

The roller body 18, 118, 218, 318 comprises a shoulder 46, 346 provided projecting in a radially inward direction from the radially inner surface 20, 220, 320.

In the embodiment shown in FIG. 2, the radially outer bearing ring 39 of the rolling bearing 36 is press fitted on the radially inner surface 20 of the roller body 18.

In this embodiment, the roller body 18 comprises a shoulder 46 provided projecting in a radially inward direction from the radially inner surface 20. The shoulder acts as a stop for the insertion of the radially outer bearing ring 39 in the roller body 18. In this embodiment, the first radially inner bearing ring 42 and the second radially inner bearing ring 43 are press fitted on the shaft 22. In order to obtain such couplings, the rolling bearing 36 is first assembled (or the rolling bearing 36 is pre-assembled), which is press fitted on the shaft 22 exerting an axial thrust on the second radially inner bearing ring 43 which is transmitted through the closing ring 44 to the first radially inner bearing ring 42. When the rolling bearing reaches the desired position on the shaft 22, the assembly of the shaft 22 and rolling bearing 36 is introduced into the inner cavity 19 from the side of the second axial end 18b of the roller body 18. In this step, the second flange 29 is decoupled from the central body 26 of the roller body 18. The rolling bearing 36 is pressed into the radially inner surface 20 of the roller body 18 by means of an axial thrust on the radial outer ring 39 until it reaches the shoulder 46 and is abutted against it. At this point, the second flange 29 can be constrained to the central body 26 of the roller body 18. At this point, the first flange 28 is also constrained to the central body 26 of the roller body 18.

In the embodiment of FIG. 2, the first flange 28 is a separate body from the central body 26 of the roller body 18 and is also constrained to the central body 26. The space in the inner cavity 19 not occupied by the rolling bearing 36 can be filled with oil or lubricating grease.

Also in the embodiment shown in FIG. 3, the radially outer bearing ring 39 of the rolling bearing 36 is press fitted on the radially inner surface 20 of the roller body 118.

The difference with the embodiment of FIG. 2 is that the first radially inner bearing ring 42 and the second radially inner bearing ring 43 can be press fitted on the shaft 122 or can be inserted on the shaft 122 and be able to move axially with respect thereto.

In this embodiment, the shaft 122 comprises a first annular recess 47 obtained on the radially outer surface. Such a first recess 47 is placed at the beginning of the second zone 38 of the inner cavity 19. In other words, the first recess 47 is placed axially at the outermost axial position occupied by the second radially inner bearing ring 43.

Inside the first recess 47, a stop ring 48 is inserted which serves as an axial abutment for the second radially inner bearing ring 43. The stop ring 48 can be inserted and, if necessary, removed from the first recess 47 and can for example be a seeger.

The shaft 122 further comprises a second annular recess 49 obtained on the radially outer surface. Such a second recess 49 is placed at the beginning of the first zone 37 of the inner cavity 19. In other words, the second recess 49 is axially placed at the outermost axial position occupied by the first radially inner bearing ring 42. Inside the second recess 49, a stop ring 50 is inserted which serves as an axial abutment for the second radially inner bearing ring 43. The stop ring 50 can be inserted and, if necessary, removed from the second recess 49 and can for example be a seeger.

In order to seat the rolling bearing 36, if the rolling bearing 36 is pre-assembled and the radially inner bearing rings 42, 43 are press fitted on the shaft 122, the rolling bearing 36 is press fitted on the shaft 122 exerting an axial thrust on the second radially inner bearing ring 43 which is transmitted through the closing ring 44 to the first radially inner bearing ring 42. On the shaft 122, the stop ring 50 was previously inserted into the second recess 49. When the rolling bearing reaches the stop ring on the shaft 122, the stop ring 48 is inserted into the first recess 48, further locking (in addition to the locking provided by the press fitting) the rolling bearing 36 axially on the shaft 122. The assembly of the shaft 122 and rolling bearing 36 is introduced into the inner cavity 19 from the side of the second axial end 18b of the roller body 118. In this step, the second flange 29 is decoupled from the central body 126 of the roller body 118. The rolling bearing 36 is pressed into the radially inner surface 20 of the roller body 118 by means of an axial thrust on the radial outer ring 39 until it reaches the shoulder 46 and is abutted against it. At this point, the second flange 29 can be constrained to the central body 126 of the roller body 118. At this point, the first flange 28 is also constrained to the central body 126 of the roller body 118.

In the case where the rolling bearing 36 is pre-assembled and the radially inner bearing rings 42, 43 are not mounted on the shaft 122, the radially outer bearing ring 39 is mounted on the radially inner surface 20 of the roller body 118. The bearing ring 39 is press fitted axially onto the radially inner surface 20 of the roller body 118 until the radially outer bearing ring 39 reaches the shoulder 46 and is abutted against it. Next, the stop ring 48 is inserted into the first recess 47 of the shaft 122. The shaft 122 is then introduced into the inner recess 19 from the side of the second axial end 18b of the roller body 118, until the stop ring 48 comes into axial contact with the second radially inner bearing ring 43. In this step, the shaft 122 slides axially with respect to the rolling bearing 36 without interference. At this point the stop ring 50 is inserted into the second recess 49, axially locking the shaft 122 and rolling bearing 36. At this point, the first flange 28 and the second flange 29 are constrained to the central body 126 of the roller body 118.

If the rolling bearing 36 is not pre-assembled, the radially outer bearing ring 39 is first press fitted against the radially inner surface 20 of the roller body 118 until the radially outer bearing ring 39 is axially abutted against the shoulder 46. The shaft 122 is then inserted into the roller body 118. At this point, the first radially inner bearing ring 42 with the first assembly of rolling bodies 40 is inserted on the shaft 122, and the assembly of the first radially inner bearing ring 42 and the first assembly of rolling bodies 40 is axially slid until it reaches and couples with the radially outer bearing ring 39. The closing ring 44 is inserted on the shaft 122, which goes in axial abutment against the first radially inner bearing ring 42. Next, the second radially inner bearing ring 43 and the second assembly of rolling bodies 41 are inserted on the shaft 122, and the assembly of the second radially inner bearing ring 43 and the second assembly of rolling bodies 41 is axially slid until it reaches and abuts against the closing ring 44, so that the assembly of the second radially inner bearing ring 43 and the second assembly of rolling bodies 41 reaches and abuts the radially outer bearing ring 39. At this point, the stop ring 48 is inserted into the first recess 47 so that it comes into contact with the second radially inner bearing ring 43. The stop ring 50 is inserted into the second recess 49 after the second radially inner bearing ring 43 has been inserted into the shaft 122 or before the second radially inner bearing ring 43 is inserted into the shaft. At this point, the first flange 28 and the second flange 29 are constrained to the central body 126 of the roller body 118.

In the embodiment shown in FIG. 4, the roller body 218 comprises a first annular recess 51 obtained on the radially inner surface 220. Such a first recess 51 is placed at the beginning of the first zone 237 of the inner cavity 219. In other words, the first recess 51 is axially placed at the outermost axial position occupied by the radially outer bearing ring 39. Inside the first recess 51 is a stop ring 52 which acts as an axial abutment for the radially outer bearing ring 39. The stop ring 52 can be inserted and, if necessary, removed from the first recess 51 and can for example be a seeger.

The roller body 218 further comprises a second annular recess 53 obtained on the radially outer surface 220. Such a second recess 53 is placed at the beginning of the second zone 238 of the inner cavity 219. In other words, the second recess 53 is axially placed at the outermost axial position occupied by the radially outer bearing ring 39 on the opposite side of the first recess 51. Inside the second recess 53, a stop ring 54 is inserted which acts as an axial abutment for the radially outer bearing ring 39. The stop ring 54 can be inserted and, if necessary, removed from the second recess 53 and can for example be a seeger.

The shaft 222 comprises a first annular recess 47, a second annular recess 49 and respective stop rings 48, 50 as described in relation to the embodiment of FIG. 3.

The difference between this embodiment and the embodiment shown in FIG. 3 is that the radially outer bearing ring 39 can either be press fitted in the roller body 218 or can be slidingly inserted in the roller body 218.

If the rolling bearing 36 is pre-assembled, the radially outer bearing ring 39 is press fitted in the roller body 218 and the radially inner bearing rings 42, 43 are press fitted on the shaft 222, the rolling bearing 36 is press fitted on the shaft 222 exerting an axial thrust on the second radially inner bearing ring 43 which is transmitted through the closing ring 44 to the first radially inner bearing ring 42. On the shaft 222, the stop ring 50 was previously inserted into the second recess 49. When the rolling bearing reaches the stop ring on the shaft 222, the stop ring 48 is inserted into the first recess 48, further locking (in addition to the locking provided by the press fitting) the rolling bearing 36 axially on the shaft 222. The assembly of the shaft 222 and rolling bearing 36 is introduced into the inner cavity 219 from the side of the second axial end 18b of the roller body 218. In this step, the second flange 29 is decoupled from the central body 226 of the roller body 218. The press fitting of the rolling bearing 36 on the radially inner surface 220 of the roller body 218 occurs by exerting an axial thrust on the radially outer bearing ring 39 until the latter reaches the stop ring 52 (previously inserted into the first recess 51 of the roller body 218) and is abutted against it. The stop ring 54 is then inserted into the second recess 53 of the roller body 218, axially locking (in addition to the locking given by the press fitting) the rolling bearing 36 with respect to the roller body 218. At this point, the second flange 29 can be constrained to the central body 226 of the roller body 218. At this point, the first flange 28 is also constrained to the central body 226 of the roller body 218.

If the rolling bearing 36 is pre-assembled, the radially outer bearing ring 39 is press fitted in the roller body 218 and the radially inner bearing rings 42, 43 are slidingly inserted on the shaft 222, the radially outer bearing ring 39 is press fitted on the radially inner surface 220 of the roller body 218. The press fitting of the radially outer bearing ring 39 on the radially inner surface 220 of the roller body 218 occurs by exerting an axial thrust on the radially outer bearing ring 39 until the latter reaches the stop ring 52 (previously inserted into the first recess 51 of the roller body 218) and is abutted against it. The stop ring 54 is then inserted into the second recess 53 of the roller body 218, axially locking (in addition to the locking given by the press fitting) the rolling bearing 36 with respect to the roller body 218. Next, the stop ring 48 is inserted into the first recess 47 of the shaft 222. The shaft 222 is then introduced into the inner recess 219 from the side of the second axial end 18*b* of the roller body 218, until the stop ring 48 comes into axial contact with the second radially inner bearing ring 43. In this step, the shaft 222 slides axially with respect to the rolling bearing 36 without interference. At this point the stop ring 50 is inserted into the second recess 49, axially locking the shaft 222 and rolling bearing 36. At this point, the first flange 28 and the second flange 29 are constrained to the central body 226 of the roller body 218.

If the rolling bearing 36 is pre-assembled, the radially outer bearing ring 39 is slidingly inserted into the roller body 218 and the radially inner bearing rings 42, 43 are slidingly inserted on the shaft 222, the radially outer bearing ring 39 is slidingly inserted into the roller body 218 until the radially outer bearing ring 39 reaches the stop ring 52 (previously inserted in the first recess 51 of the roller body 218) and abuts thereon. The stop ring 54 is then inserted into the second recess 53 of the roller body 218, locking the rolling bearing 36 axially with respect to the roller body 218. Next, the stop ring 48 is inserted into the first recess 47 of the shaft 222. The shaft 222 is then introduced into the inner recess 219 from the side of the second axial end 18*b* of the roller body 218, until the stop ring 48 comes into axial contact with the second radially inner bearing ring 43. In this step, the shaft 222 slides axially with respect to the rolling bearing 36 without interference. At this point the stop ring 50 is inserted into the second recess 49, axially locking the shaft 222 and rolling bearing 36. At this point, the first flange 28 and the second flange 29 are constrained to the central body 226 of the roller body 218.

Alternatively, the stop ring 48 is inserted into the first recess 47 of the shaft 222. The rolling bearing 36 is then slidingly inserted on the shaft 222 until the rolling bearing 36 abuts against the stop ring 48. At this point the stop ring 50 is inserted into the second recess 49, axially locking the shaft 222 and rolling bearing 36. The assembly of the shaft 222 and rolling bearing 36 is slidably inserted in the roller body 218 until the radially outer bearing ring 39 reaches the stop ring 52 (previously inserted into the first recess 51 of the roller body 218) and abuts thereon. The stop ring 54 is then inserted into the second recess 53 of the roller body 218, locking the rolling bearing 36 axially with respect to the roller body 218. At this point, the first flange 28 and the second flange 29 are constrained to the central body 226 of the roller body 218.

The embodiment of FIG. 5 provides the same operations described in relation to the embodiment of FIG. 3 with the difference that the first flange 328 is in a single piece with the central body 326 of the roller body 318.

The person skilled in the art will recognize that it is possible to combine the various characteristics of the embodiments described above to obtain further embodiments, all falling within the scope of the present invention as defined by the subsequent claims.

The invention claimed is:

1. A tracked undercarriage roller assembly, comprising:
a roller body having an inner cavity delimited by a radially inner surface and a shaft inserted into the inner cavity of the roller body; and
a rolling bearing comprising a single radially outer bearing ring, a first radially inner bearing ring and a second radially inner bearing ring, a first assembly of rolling bodies and a second assembly of rolling bodies, wherein the first assembly of rolling bodies is radially interposed between the radially outer bearing ring and the first radially inner bearing ring, the second assembly of rolling bodies is radially interposed between the radially outer bearing ring and the second radially inner bearing ring, wherein, between the first radially inner bearing ring and the second radially inner bearing ring, a closing ring is provided to close a lubrication cavity, wherein the radially outer bearing ring is in contact with the radially inner surface and wherein the first radially inner bearing ring and the second radially inner bearing ring are in contact with the shaft,
wherein said shaft comprises a first annular recess and a second annular recess along a radially outer surface thereof; a first stop ring being inserted in said first annular recess and being active on the second radially inner bearing ring and a second stop ring being inserted in said second annular recess and being active on the first radially inner bearing ring.

2. The tracked undercarriage roller assembly according to claim 1, wherein said roller body comprises a first axial end and a second axial end opposite to the first axial end; said rolling bearing being active between a first zone of the inner cavity of the roller body placed axially closer to the first axial end of the roller body with respect to the second axial end and a second zone of the inner cavity of the roller body placed axially closer to the second axial end of the roller body with respect to the first axial end.

3. The tracked undercarriage roller assembly according to claim 2, wherein said radially inner surface of the roller body is cylindrical between said first zone and said second zone; said inner cavity having a radial extension, between said second zone and the second axial end of the roller body, equal to or higher than an extension of the inner cavity between said first zone and said second zone.

4. The tracked undercarriage roller assembly according to claim 2, wherein said shaft comprises a central portion which extends between the first and the second zone of the inner cavity of the roller body; said central portion of the shaft having a radially outer surface that is cylindrical with a constant diameter.

5. The tracked undercarriage roller assembly according to claim 1, wherein said roller body comprises a central body, a first flange of axial end and a second flange of axial end placed at respective axial ends of the central body; said central body defining said inner cavity of the roller body.

6. The tracked undercarriage roller assembly according to claim 5, wherein the first flange is integral with the central body.

7. The tracked undercarriage roller assembly according to claim 1, wherein the radially outer bearing ring is inserted by interference fit on the radially inner surface of the roller body.

8. The tracked undercarriage roller assembly according to claim 1, wherein both radially inner bearing rings are inserted by interference fit on the shaft.

9. The tracked undercarriage roller assembly according to claim 1, wherein said radially inner bearing rings are slidably inserted on the shaft.

10. The tracked undercarriage roller assembly according to claim 1, wherein said roller body comprises a first annular recess along the radially inner surface; a first stop ring being inserted in said first annular recess and being active on the radially outer bearing ring.

11. The tracked undercarriage roller assembly according to claim 10, wherein said roller body comprises a second annular recess along the radially inner surface; a second stop ring being inserted in said second annular recess and being active on the radially outer bearing ring opposite to the first stop ring inserted in the first recess.

12. The tracked undercarriage roller assembly according to claim 11, wherein the radially outer bearing ring is slidably inserted in the inner cavity of the roller body.

13. The tracked undercarriage roller assembly according to claim 1, wherein said roller body comprises a shoulder provided on the radially inner surface; said radially outer bearing ring being in abutment against said shoulder.

\* \* \* \* \*